J. W. KINCAID.
ROTARY ENGINE.
APPLICATION FILED OCT. 21, 1912.
1,050,952.
Patented Jan. 21, 1913.
2 SHEETS—SHEET 2.
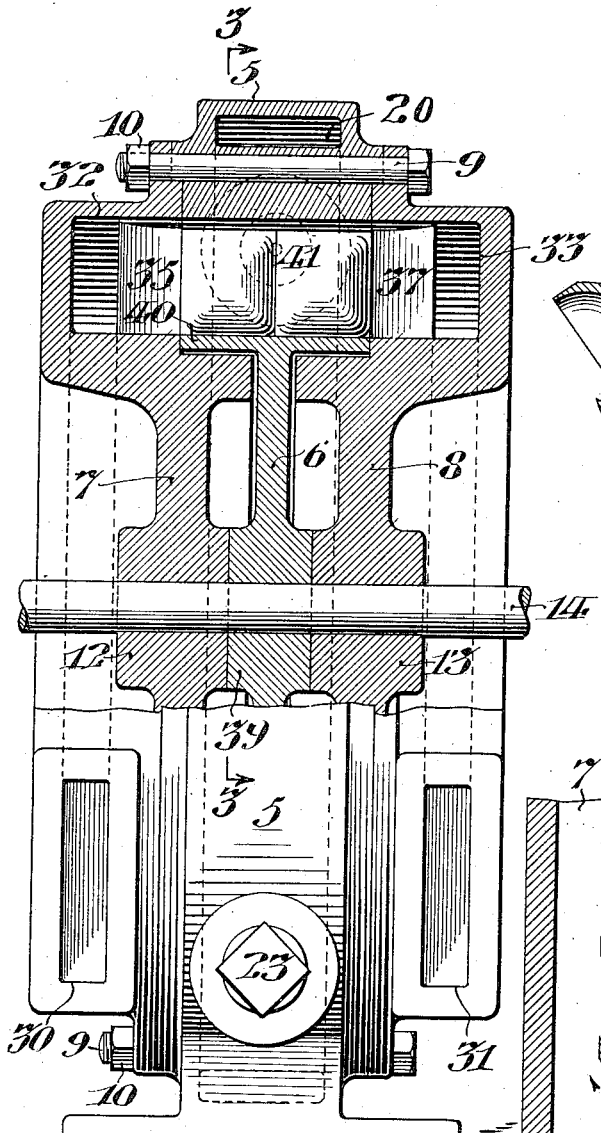
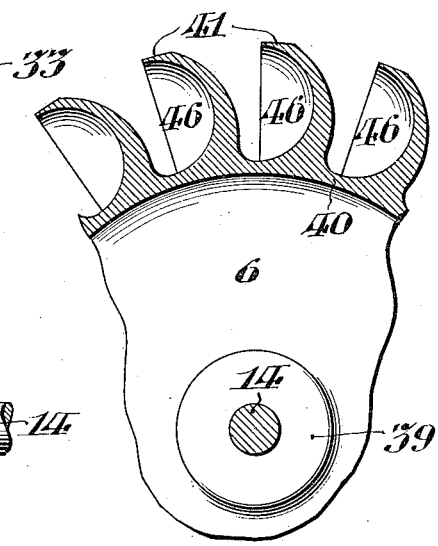
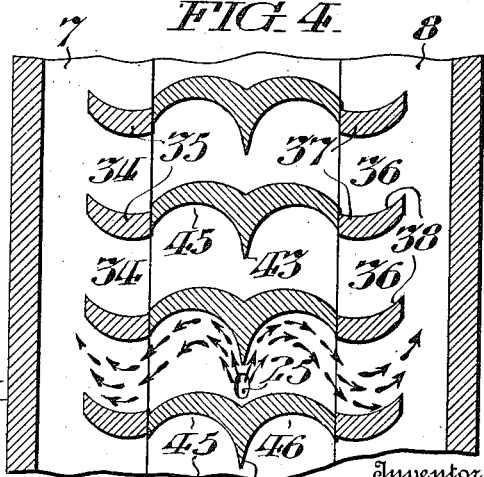
Witnesses
Clifton C. Hallowell
J. O'R. Kelly
Inventor
Joseph W. Kincaid,
By Edg. Kelly, Attorney

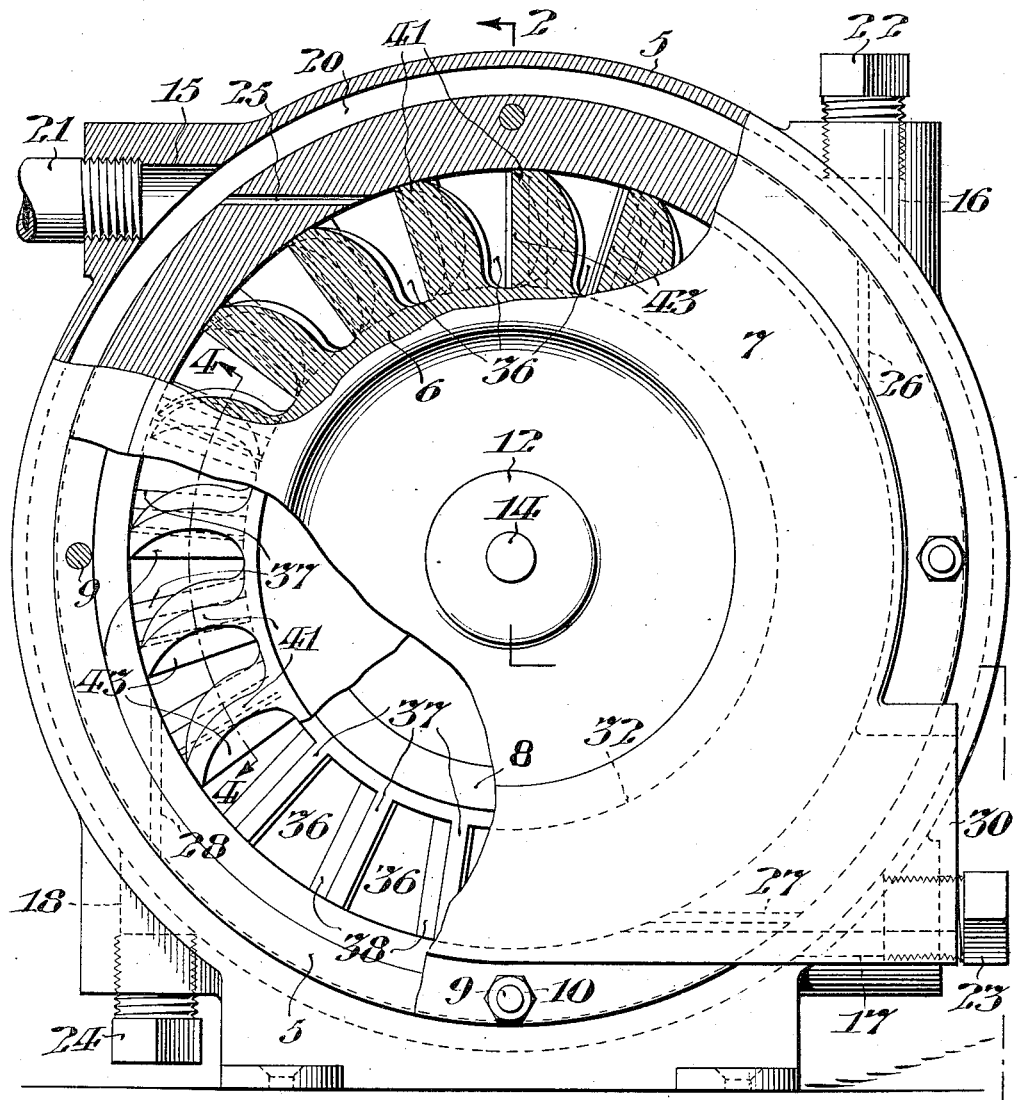

UNITED STATES PATENT OFFICE.

JOSEPH W. KINCAID, OF READING, PENNSYLVANIA, ASSIGNOR OF ONE-HALF TO KIRTIE L. HENRY, OF BIRDSBORO, PENNSYLVANIA.

ROTARY ENGINE.

1,050,952. Specification of Letters Patent. Patented Jan. 21, 1913.

Application filed October 21, 1912. Serial No. 726,896.

*To all whom it may concern:*

Be it known that I, JOSEPH W. KINCAID, a citizen of the United States, residing at Reading, in the county of Berks and State of Pennsylvania, have invented certain new and useful Improvements in Rotary Engines, of which the following is a specification.

My invention particularly relates to that class of engines in which a piston having blades or vanes is mounted for rotation within an inclosed casing, and is especially applicable to engines actuated by steam pressure, continuously admitted behind such blades.

The principal objects of my invention are to provide a rotary engine which is simple in its construction, efficient in its actuation, and substantially noiseless in its operation.

Other objects of my invention are to provide a rotary engine in which the pressure fluid is divided by the piston, and directed laterally, to provide means suitably spaced in the engine casing toward which the pressure fluid is directed to aid in effecting the rotation of said piston, and to provide means for separately exhausting the pressure thus divided.

Further objects of my invention are to provide a rotary engine having oppositely disposed pockets or recesses in its coöperative rotary and stationary parts respectively, for directing the pressure fluid in a curved or indirect passage, and to provide blades or vanes on the rotary piston, spaced differently from the corresponding stationary members in the casing.

My invention comprehends a rotary engine having the spaces between the blades of the rotary piston and the corresponding stationary members, gradually increasing in the direction of rotation.

Another object of my invention is to provide a rotary engine wherein access to all of the working parts may be readily afforded by merely removing the side plate of the engine casing.

My invention specifically stated comprehends a rotary engine having an annular casing provided with an inlet for the pressure fluid, side plates for said casing, forming an inclosed piston chamber and providing bearing for the piston shaft, said plates each having an exhaust passage and outlet, and having their opposed faces provided with a series of laterally broadened spokes cylindrically curved outwardly in the direction of rotation of the engine, and a piston mounted for rotation in said chamber and having blades or vanes having spherical pockets coöperative with said cylindrically curved spokes to direct the pressure fluid in an indirect or double curved line to produce an added impulse to the piston, said impulse being produced by the well known effort of a jet of steam or like fluid to assume a straight or direct line.

My invention also includes all of the various novel features of construction and arrangement of the parts hereinafter more definitely specified.

In the accompanying drawings Figure 1 is a side elevational view of a rotary engine showing a convenient embodiment of my invention, portions being broken away for convenience of illustration. Fig. 2 is a transverse section of said engine taken on the line 2—2 in Fig. 1. Fig. 3 is a fragmentary sectional view of the rotary piston taken on the line 3—3 in Fig. 2. Fig. 4 is a curved sectional view of the engine taken on the line 4—4 in Fig. 1, and extended in a plane.

In said figures the engine comprises the annular casing body 5, forming a cylindrical chamber for the rotary piston 6, and the side plates 7 and 8, conveniently secured to the opposite sides of said casing body 5, by the bolts 9, and nuts 10, and respectively providing bearings 12 and 13 for the piston shaft 14. The casing body 5 is conveniently provided with the inlet ports 15, 16, 17, and 18, any or all of which may be utilized to admit pressure fluid to the annular inlet passageway 20, which in the illustration shown in Fig. 1 is connected through the inlet 15 by the pipe 21 with the source of pressure fluid supply, the inlets 16, 17 and 18 being conveniently closed by suitable screw plugs 22, 23 and 24. The inlet passageway 20 is connected with the piston chamber, by the inlet ducts 25, 26, 27 and 28, which are conveniently disposed in a medial plane transverse to the axis of rotation of the piston, and in axial alinement with the inlets 15, 16, 17 and 18 respectively; thus it will be seen that said inlets serve as a means through which said ducts may be readily drilled. The side plates 7 and 8 are respectively provided with the exhaust outlets 30 and 31, which are connected with the respective exhaust chambers 32 and 33 in the plates 7 and 8, the exhaust chamber 32 in the plate 7 communicating with the piston chamber in the casing body 5 through a circular series of ports 34 formed by the spokes 35, and the exhaust chamber 33 in the plate 8 communicating with the piston chamber through a circular series of ports 36 formed by the spokes 37.

As best shown in Fig. 1, the spokes 35 and 37 extend substantially radial to the axis of rotation of the piston 6, and as shown in Fig. 4 are cylindrically curved outwardly, and provide concave surfaces 38, directed in the direction of rotation of the rotary piston 6. The rotary piston 6 has the hub 39 in which the shaft 14 may be secured in any suitable and well known manner, and is provided with the rim 40, from the outer face of which extend the blades or vanes 41, which snugly fit the rotary path provided by the chamber in the casing body 5, and the side plates 7 and 8, as best shown in Fig. 2.

As best shown in Figs. 3 and 4, the blades or vanes 41 on the rim 40 of the rotary piston 6 have the central tongue 43 sharpened rearwardly and merging upon both sides into substantially spherical recesses or pockets 45 and 46, which are respectively coöperative with the recesses in spokes 35 and 37, to form individual double curve or substantially S-shaped passageways upon the opposite sides of a medial plane.

It will be observed, by reference to Fig. 4, that by reason of the fact that the number of ports 34 and 36 in the respective side plates 7 and 8 exceed the number of vanes 41 on the piston 6, the space between the spherical surfaces of the piston vanes 41, and the coöperative cylindrical surfaces of the spokes 35 and 37, gradually increases in the direction of rotation of said piston from the inlet ducts, which effects an even rotation of the piston and a consequent substantially noiseless actuation of the engine.

I do not desire to limit myself to the precise details of construction and arrangement of the parts as herein set forth, as it is obvious that various modifications may be made therein without departing from the essential features of my invention as defined in the appended claim.

Having thus described my invention, I claim:—

A rotary engine of the class described having an annular casing member forming a piston chamber, side plates for said casing inclosing the piston chamber and providing bearings for the piston shaft and having pressure inlets and outlets communicating with said chamber, a plurality of laterally broadened spokes cylindrically curved outwardly in the direction of rotation of the engine, forming a circular series of ports disposed upon opposite sides of said chamber, and a piston rotatably mounted in said chamber and having blades, each being provided with spherical pockets respectively coöperative with the curved surface of the spokes upon the opposite sides of said chamber to direct the pressure fluid in a double curved line to produce an added impulse to the piston, said pockets being separated by a rearwardly extending tongue having its edge extending radial to the axis of rotation of the piston and sharpened to equally divide the pressure fluid admitted through the inlets.

In testimony whereof I affix my signature in presence of two witnesses.

JOSEPH W. KINCAID.

Witnesses:
 ED. A. KELLY,
 CLARA E. YOUNG.

---

Copies of this patent may be obtained for five cents each, by addressing the "Commissioner of Patents, Washington, D. C."